(12) United States Patent
Gangadharappa et al.

(10) Patent No.: US 10,134,067 B2
(45) Date of Patent: Nov. 20, 2018

(54) AUTOCOMPLETE OF SEARCHES FOR DATA STORED IN MULTI-TENANT ARCHITECTURE

(71) Applicant: Ariba, Inc., Sunnyvale, CA (US)

(72) Inventors: Kiran Gangadharappa, Mountain View, CA (US); Raj Vuppala, Dublin, CA (US); Dinesh Shahane, Cupertino, CA (US); Harshad Chavan, Cupertino, CA (US)

(73) Assignee: Ariba, Inc., Sunnyvale, CA (US)

( * ) Notice: Subject to any disclaimer, the term of this patent is extended or adjusted under 35 U.S.C. 154(b) by 555 days.

(21) Appl. No.: 14/809,821

(22) Filed: Jul. 27, 2015

(65) Prior Publication Data
US 2017/0032136 A1  Feb. 2, 2017

(51) Int. Cl.
| G06F 7/00 | (2006.01) |
| G06F 17/30 | (2006.01) |
| G06Q 30/06 | (2012.01) |
| G06F 21/62 | (2013.01) |

(52) U.S. Cl.
CPC ..... *G06Q 30/0603* (2013.01); *G06F 17/3064* (2013.01); *G06F 17/30705* (2013.01); *G06F 21/6227* (2013.01); *G06Q 30/0625* (2013.01)

(58) Field of Classification Search
CPC .......... G06F 17/3064; G06F 17/30705; G06F 21/6227; G06Q 30/0603; G06Q 30/0625
See application file for complete search history.

(56) References Cited

U.S. PATENT DOCUMENTS

| 2009/0043741 A1* | 2/2009 | Kim | G06F 17/276 |
| 2010/0010977 A1* | 1/2010 | Choi | G06F 17/3064 707/E17.014 |
| 2011/0307498 A1* | 12/2011 | McFarlane | G06F 17/30864 707/749 |
| 2013/0173650 A1* | 7/2013 | Marantz | G06F 17/30864 707/767 |

* cited by examiner

*Primary Examiner* — Azam M Cheema
(74) *Attorney, Agent, or Firm* — Schwegman Lundberg & Woessner, P.A.

(57) ABSTRACT

In an example embodiment, identifications of user actions are received from a first user device, the user actions being actions related to identifying data from a multi-tenant database to view. A portion of a first search query is received from a first user device corresponding to a first tenant in a multi-tenant architecture. A list of permissions for the first user device is then obtained. A plurality of fields is retrieved from a multi-tenant database based on the portion of the first search query, the fields obtained from data stored by multiple different tenants in the multi-tenant database, the plurality of fields retrieved being limited to fields for which the first user device has permission to view. Then a plurality of autocomplete suggestions are identified from the plurality of retrieved fields, the identifying based on the user actions.

20 Claims, 15 Drawing Sheets

FIG. 6

| HOME | CONTRACTS | MANAGE | RECENT | PREFERENCES | COMMUNITY |
| SPEND MANAGEMENT | AW OPTIONS... | PAGE GENERATIONS 113713 ☒ | HOME | HELP | LOGOUT |
| CREATE | SEARCH | PROCUREMENT | T&E | INVOICING | CATALOG |

600

SHOP BY CATEGORY ▶ COMPUTERS AND I... ▼ — 700 ▶ 🔍

FILTER BY

SEARCH WITHIN RESULTS 🔍

CONTRACT
SEARCH FOR CONTRACTS

KEYWORD
DESKTOP (3)
MEDIASTAR (2)
MULTISYNC (2)
SVGA (2)

MANUFACTURER
NEC USA INC. (2)
PROMXIA INC. (3)
TOSHIBA AMERICA...(2)

PRICE
$1,000.00 - $10,000...(6)
$10,000.00 - ....(1)
SEE MORE

CATALOG HOME > COMPUTERS AND IT EQUIPMENT > PRINTING, PHOTOGRAPHIC ...

7 ITEM(S) FOUND        SORT BY: [ RELEVANCE ]

ADD TO CART    VIEW: 🗒 ⊞

☐  DESKTOP VIDEO PROJECTOR 4200Z (SVGA)         $5,795.00 USD / EACH
    SUPPLIER: MANTELL OFFICE                         QTY: [ 1 ]
    SUPPLIER PART #: DP4200                          ADD TO CART
    AVAILABLE IN: 10 DAY(S)                          ADD TO FAVORITES
☐ COMPARE

☐  DESKTOP VIDEO PROJECTOR 5600 (SVGA)          $7,765.00 USD / EACH
    SUPPLIER: MANTELL OFFICE                         QTY: [ 1 ]
    SUPPLIER PART #: DP5600                          ADD TO CART
    AVAILABLE IN: 10 DAY(S)                          ADD TO FAVORITES
☐ COMPARE

☐  HIGH RES. DESKTOP VIDEO PROJECTOR 9100       $11,248.00 USD/ EACH
    SUPPLIER: MANTELL OFFICE                         QTY: [ 1 ]
    SUPPLIER PART #: DP9100                          ADD TO CART
    AVAILABLE IN: 10 DAY(S)

*FIG. 7*

| SPEND MANAGEMENT | AW OPTIONS... | | | PAGE GENERATIONS ☒ 113713 | HOME \| HELP \| LOGOUT |
|---|---|---|---|---|---|

| HOME | CONTRACTS | PROCUREMENT | T&E | INVOICING | CATALOG |
|---|---|---|---|---|---|

CREATE  SEARCH  MANAGE  RECENT  PREFERENCES  COMMUNITY

SHOP BY CATEGORY ▼  COMPUTERS AND I... ▼ | DESK — 602 ___ | ▶ 🔍  🖃 🗐 🛒

— 600

FILTER BY     CATALOG HOME > COMP | DESKTOP
SEARCH WITHIN RESULTS 🔍                  | DESKTOP VIDEO
                                          | DESKTOP VIDEO PROJECTOR

CONTRACT
SEARCH FOR CONTRACTS

7 ITEM(S) FOUND                                              SORT BY: | RELEVANCE ▼ | — 604

☐ ADD TO CART    VIEW: 🗐 🏛

KEYWORD
DESKTOP (3)         ☐ ▢  DESKTOP VIDEO PROJECTOR 4200Z (SVGA)        $5,795.00 USD / EACH
MEDIASTAR (2)              SUPPLIER: MANTELL OFFICE                      QTY: [ 1 ]
MULTISYNC (2)              SUPPLIER PART #: DP4200                       [ ADD TO CART ]
SVGA (2)                   AVAILABLE IN: 10 DAY(S)
                           ☐ COMPARE                                     ADD TO FAVORITES

MANUFACTURER
NEC USA INC. (2)    ☐ ▢  DESKTOP VIDEO PROJECTOR 5600 (SVGA)         $7,765.00 USD / EACH
PROMXIA INC. (3)           SUPPLIER: MANTELL OFFICE                      QTY: [ 1 ]
TOSHIBA AMERICA... (2)     SUPPLIER PART #: DP5600                       [ ADD TO CART ]
                           AVAILABLE IN: 10 DAY(S)
                           ☐ COMPARE                                     ADD TO FAVORITES

PRICE
$1,000.00 - $10,000... (6)  ☐ ▢  HIGH RES. DESKTOP VIDEO PROJECTOR 9100  $11,248.00 USD / EACH
$10,000.00 - ... (1)               SUPPLIER: MANTELL OFFICE                   QTY: [ 1 ]
SEE MORE                           SUPPLIER PART #: DP9100                    [ ADD TO CART ]
                                   AVAILABLE IN: 10 DAY(S)

| SHOP BY CATEGORY ▼ | ALL CATEGORIES ▼ | 1800 | 1800FLOWERS.COM | | | |
|---|---|---|---|---|---|---|
| HARDWARE(443) SEE MORE | | | | | | |
| CATEGORY | □ COMPARE | | ERGOPAD PREMIER SOFT MOUSE PAD SUPPLIER: DIGI STORAGE SUPPLIER PART #: 101463 AVAILABLE IN: 0 DAY(S) | $152.00 USD / EACH QTY: [1] | ADD TO CART | ADD TO FAVORITES |
| BUSINESS CARDS(2) DESKTOP TRAYS OR... (8) DIALYSIS EQUIPMENT... (19) SEE MORE | □ COMPARE | | | | | |
| SUPPLIER | □ COMPARE | | MOUSE ADAPTER SUPPLIER: DIGI STORAGE SUPPLIER PART #: 107789 AVAILABLE IN: 0 DAY(S) | $144.00 USD / EACH QTY: [1] | ADD TO CART | ADD TO FAVORITES |
| [UNSPECIFIED] (81) APEX CORPORATION (64) DIGI STORAGE (216) SEE MORE | □ COMPARE | | | | | |
| MANUFACTURER | □ COMPARE | | KV SS55EX HIGH SPEED SCANNER SUPPLIER: DIGI STORAGE SUPPLIER PART #: 102139 AVAILABLE IN: 0 DAY(S) | $4,928.00 USD / EACH QTY: [1] | ADD TO CART | ADD TO FAVORITES |
| 1800FLOWERS.COM (62) BELKIN COMPONENTS (53) FELOWES ... (76) | □ COMPARE | | | | | |
| PRICE | | | KEYBOARD W/ERGOTRACK POINTING SUPPLIER: DIGI STORAGE | $205.00 USD / EACH QTY: [1] | | |
| $0.00 USD (136) $0.01 - $10.00 USD (156) $10.00 - $100.0 USD (444) $100.00 - 1,000.00 ... (242) $1,000.00 - $10,000 ... (36) SEE MORE | | | | | | |

1300, 1302, 1304

AUTOCOMPLETE OF SEARCHES FOR DATA STORED IN MULTI-TENANT ARCHITECTURE

TECHNICAL FIELD

This document generally relates to methods and systems for use with computer networks and applications deployed in them. More particularly, this document relates to the automatic completion of searches for data stored in a multi-tenant architecture.

BACKGROUND

The indexing and searching of structured data are important functionalities for many businesses on both sides of sales transactions. For example, sellers may provide access to catalog data (including, for example, product information on various products for sale) to buyers to allow buyers to select items to purchase or contract for. This type of usage is especially prevalent for businesses, which often procure items in large quantities directly from a supplier. Traditionally, such structured data was stored in dedicated databases. An authorized buyer, for example, would gain viewing access to a supplier's database and thus be able to search the products in the database directly.

Recently, there has been increased movement of data to the cloud. In such cloud environments, there is a lot more data (in both quantity and size) to be stored. This can complicate the process of indexing the data in order for it to be efficiently stored, but also creates the problem of efficiently storing such large amounts of data, potentially across multiple tenants. It is common, for example, for tenants to store catalog data in a multi-tenant architecture. It can be difficult, however, for a user to search for catalog data from multiple catalogs simultaneously without having advanced knowledge of the contents of each catalog.

BRIEF DESCRIPTION OF DRAWINGS

The present disclosure is illustrated by way of example and not limitation in the figures of the accompanying drawings.

FIG. 6 is a screen capture illustrating a user interface, in accordance with an example embodiment.

FIG. 7 is a screen capture illustrating the user interface of FIG. 6, in accordance with an example embodiment, after a selection of a context by a user.

FIG. 8 is a screen capture illustrating the user interface of FIG. 7, in accordance with an example embodiment, after the user begins typing.

FIG. 11 is a screen capture illustrating a user interface, in accordance with another example embodiment.

FIG. 12 is a screen capture illustrating the user interface of FIG. 11, in accordance with an example embodiment, as the user types additional terms.

FIG. 13 is a screen capture illustrating a user interface, in accordance with another example embodiment.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

In an example embodiment, a solution is provided that provides for autocomplete of searches for data in a multi-tenant architecture. When a user begins typing a search, the system may take what the user has typed so far and suggest remaining letters to complete the word the user is currently typing, as well as suggest additional terms to complete the search as a whole. The letters and terms suggested are based, at least partially, on the context of the search. The concept of the context of the search will be described in more detail below, but generally refers to actions taken by the user prior to the search, with regards to the data ultimately searched. The context of the search may be used to filter out letters or terms that are not relevant to the data the user wants searched, even if the user hasn't explicitly specified the data to search. Additionally, in an example embodiment, the letters and terms suggested are based on user permissions, which allows the system to prevent particular suggestions when a user does not have access to the data pertaining to those suggestions, such as commonly occurs in a multi-tenant architecture.

Figure 1:
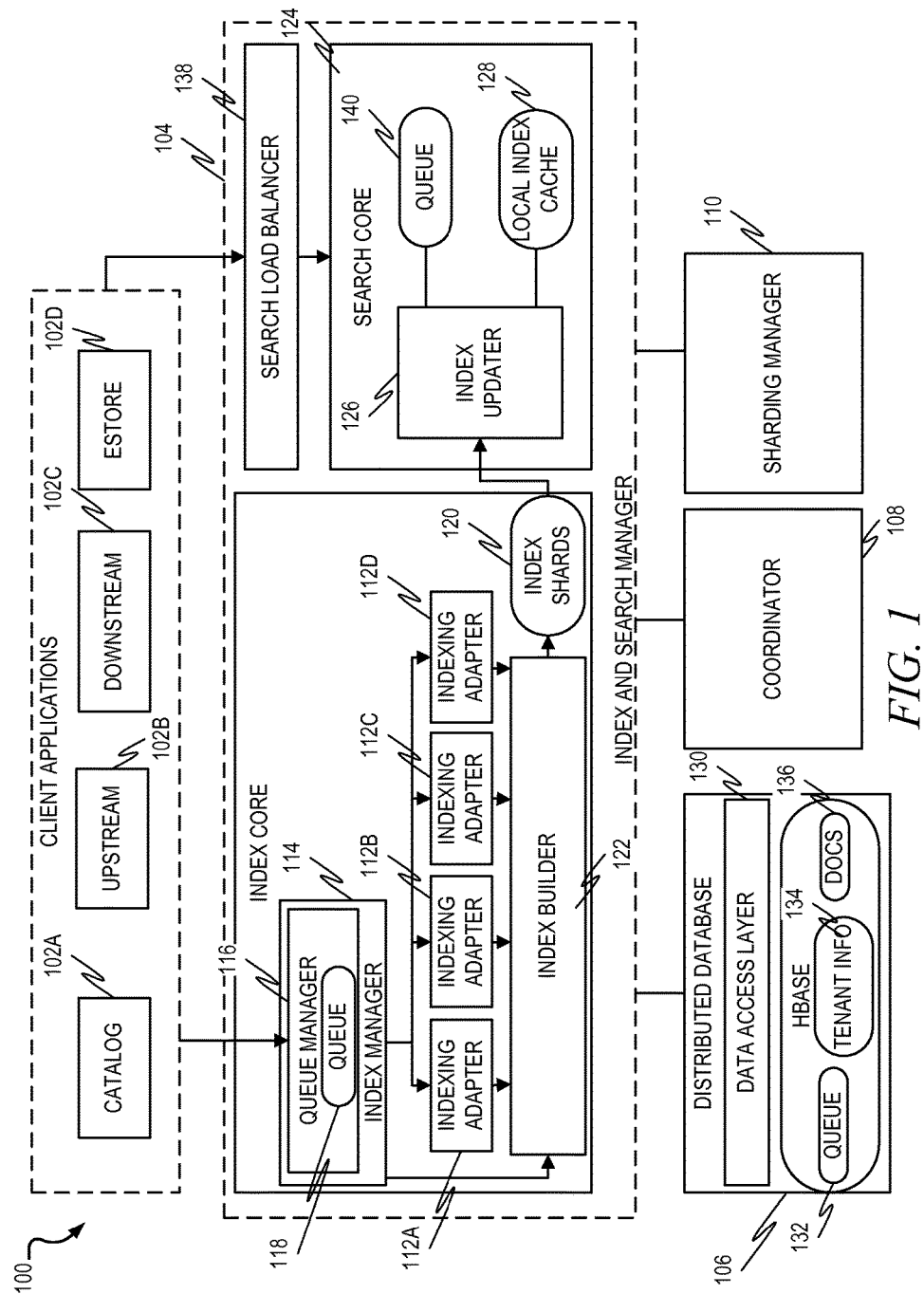
FIG. 1 is a block diagram illustrating a system, in accordance with an example embodiment, for indexing and searching structured data.

FIG. 1 is a block diagram illustrating a system 100, in accordance with an example embodiment, for indexing and searching structured data. The system 100 includes one or more client applications 102A, 102B, 102C, 102D, an index and search manager 104, a distributed database 106, a coordinator 108, and a sharding manager 110. Each client application 102A, 102B, 102C, 102D may represent a different application providing data to be indexed and eventually searched by the system 100. A single tenant (e.g., customer such as a company) may provide multiple clients, while other tenants may provide just a single client. In the depicted figure, client application 102A is or includes a catalog application, client application 102B is or includes an upstream application, client application 102C is or includes a downstream application, and client application 102D is or includes an eStore application.

Client applications 102A, 102B, 102C, 102D may provide one or more of three different types of data streams (not pictured). Each data stream may have its own different data with distinct lifecycle and purpose. These data streams may be known as primary, auxiliary, and relevance and ranking (R/R). The primary data stream may include primary data, which is the data that is the main subject of indexing and searching. The auxiliary data stream may include data that is not directly indexed or searched but may enrich the primary data. The R/R data stream may include R/R data, which is data that plays a role in relevance and ranking of primary data items during searching. As illustrative examples, if the client application 102A provides a catalog, the primary data may include Catalog Interchange Format (CIF) and Catalog Extensible Markup Language (cXML) catalogs, with the auxiliary data including supplier records, type definitions, contracts, and views, and the R/R data including a click stream and transaction data. If the client application 102B provides upstream information, the primary data may include contracts and projects, with the auxiliary data including entitlement information and the R/R data including a click stream. If the client application 102C provides downstream information, the primary data may include approvables, with the auxiliary data including master data and the R/R data including transaction data.

Data streams can be transported as single documents, a multi-part collection, or a set of documents. For each client application 102A, 102B, 102C, 102D, an indexing adapter 112A, 112B, 112C, 112D may be provided. Each indexing adapter 112A, 112B, 112C, 112D can include a parser created to parse document types supported by the corresponding client application 102A, 102B, 102C, 102D. As an example, client application 102A providing catalog data may utilize indexing adapter 112A, which may include a CIF parser (to parse primary CIF catalog data) and various XM parsers for the auxiliary data, such as kit information, units of measure (UOM) map, etc. Each parser may have two modes. The first mode can parse the byte stream of the incoming documents into rows. The second mode can parse the rows into an indexable object.

As pictured, the indexing adapters 112A, 112B, 112C, 112D may actually be contained in the index and search manager 104. An index manager 114 may act to manage the indexing process. This may include a queue manager 116 which manages a queue 118 containing incoming data from the client applications 102A, 102B, 102C, 102D, which needs to be indexed. The index manager 114 may act to send data at the front of the queue 118 to the appropriate indexing adapter 112A, 112B, 112C, 112D for the corresponding client while also building a request to an index builder.

In an example embodiment, the index manager 114 may have a redundant architecture that provides an application programming interface (API) to the client applications 102A, 102B, 102C, 102D to allow the client applications 102A, 102B, 102C, 102D to submit indexing jobs. The indexing message produced through the API may contain enough information to uniquely identify the request. This identification could be used to track the status of the submitted jobs.

The index manager 114 may utilize feedback from the distributed database 106 to decide on the indexing jobs to be run in the database 106 to allow a scalable computing architecture for building index shards 120. Specifically, the index manager 114 may send a request to build an index to the index builder 122, which may build the index shards 120. A search core 124 may contain an index updater 126, which can take the index shards 120 and update a local index cache 128 using the index shards 120. This local index cache 128 can then be synchronized with a network file system, which can then distribute the index to the distributed database 106. Each index shard 120 is a subset of the index for a given file type. For example, a shard could include catalog items from a subset of tenants. For large catalogs, a single catalog may span multiple index shards 120.

The distributed database 106 may may contain a data access layer 130, a queue 132, tenant information 134, and documents 136.

The search core 124 may host a Lucene index and answer search queries via search load balancer 138, which acts to balance the load of search requests among multiple instantiations of the search cores 124 on multiple physical or logical servers. The search core 124 may also expose a REST-based search and faceting API (not pictured). The search core 124 may perform aggregation, faceting, ranking, and relevance algorithms on search results. The source documents are primary indexing targets. Each source document may store a document identification key for auxiliary data. In an example embodiment, the auxiliary data itself is stored in the same index shard 120. This allows for locality of reference, so that access to an auxiliary data item related to a primary data item can be easily retrieved during a search.

The search core 124 may keep track of recent changes to the local index cache 128 in a special queue 140 receiving the updates to support search. The updates may be immediately applied to the reader but may be batched before committing to the local index segments.

The index manager 114 may use information from the coordinator 108 and the sharding manager 110 to decide on the indexing jobs to be run in the distributed database 106 to allow a scalable computing architecture for building the index shards 120.

Each index shard 120 may contain Lucene index segments for a set of tenants, as will be described in more detail below. The job of indexing may be designed as a map-reduce job that parses the source document and any auxiliary documents to create the Lucene indexing segments.

Within the local index cache 128, the primary documents may be modeled as Lucene "documents". The document fields, their indexing properties (stored, indexed, etc.), norms, etc. may be modeled in the bundle providing the local index cache 128. The auxiliary document identifications may be stored in the Lucene document for linking the auxiliary data. The actual auxiliary documents may be stored in the same index as separate documents 136. For example, a single shard may contain documents 136 relating to a first tenant, including a first catalog item (with item attributes and supplied identification), a second catalog item (with item attributes and supplied identification), a third catalog item (with item attributes and supplied identification), and a supplier document with three different supplier detail files. The supplier document is a single document with the supplier detail files being auxiliary documents. The supplier document may be stored with a key matching the supplier identification field in each source document in the index.

The coordinator 108 may implement a protocol for routing, shard configuration, rolling-apply, and other management functions. The coordinator 108 may additionally provide the node status and consensus protocol.

The sharding manager 110 may implement the elasticity architecture for distributing the index across search cores 124. In an example embodiment, the sharding manager 110 may receive a HyperText Transfer Protocol (HTTP) request for a search and is aware of which search core 124 can respond to this request. It can then route the request to the specific search core 124, perhaps based, at least partially, on load balancing if multiple search cores 124 can respond to the request. The search core 124 may then use libraries to parse the queries and launch a search and then respond with matches found in an extensible markup language (XML) document. The XML document may comprise primary data along with the supporting auxiliary data In an example embodiment, data from the client applications 102A, 102B, 102C, 102D is indexed to be stored in a multi-tenant, multi-modal, distributed database (e.g., distributed database 106). "Multi-tenant" means that the data from one entity is stored along with the data from another entity, which, as will be seen, makes storage more efficient. "Multimodal" means that data from multiple client applications 102A, 102B, 102C, 102D of a single entity, including data that is parsed using a completely separate indexing adapter 112A, 112B, 112C, 112D, can be stored within that tenant's area of the distributed database 106. The distributed database 106 itself can then be distributed among multiple physical and/or logical servers.

Additionally, as will be discussed in more detail below, the distribution of the distributed database 106 can be dynamically altered so that tenants can be dynamically reassigned to different physical and/or logical servers at any time. This may be based, for example, on need, which may be based on a combination of factors, including data size, data quantity, size of the entity, and frequency of search.

As described briefly above, sharding allows for the segmentation of large amounts of data to be indexed. A segment may also be known as a tenant and represents a parameter for segmenting data. It can map to a platform tenant or some other type of entity. An object class is a search infrastructure used to support the searching of data items. The object class defines the data. It can indicate that the data is, for example, catalog data, requisition data, contract data, etc.

In an example embodiment, sharding is driven by four goals: availability, scalability, elasticity, and flexibility. Availability indicates that indexed data should be highly available (e.g., little chance of being unable to access the data at any point in time, even if some storage locations are inaccessible or down). Scalability indicates that the search infrastructure should be able to function well as the size grows, both in terms of index size and in terms of search volume. Elasticity indicates that there is an ability to dynamically assign capacity to tenants to make it easier to plan capacity and achieve better resource utilization. Flexibility indicates that different scalability requirements for different tenants or data classes can be supported.

As described above, the indexing itself may be performed using Lucene indexes. Lucene works by taking documents 136 and fields. A document in Lucene is a class that represents a searchable item. The document is converted into a stream of plain-text tokens. The tokens are then analyzed to make the tokens more friendly for indexing and storage. Then the tokens are stored in an inverted index. Additional details about Lucene indexes are beyond the scope of this disclosure.

Figure 2:
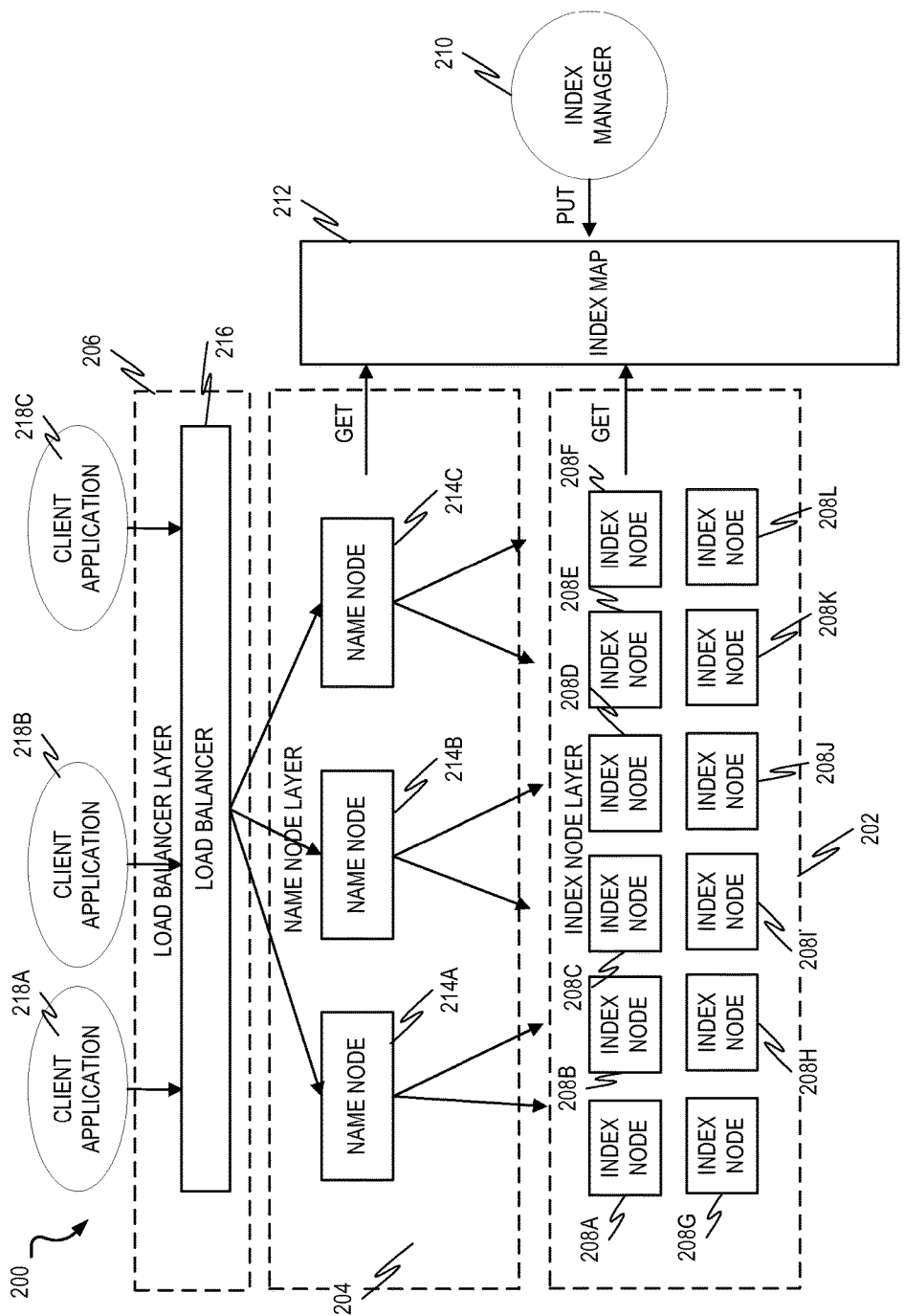
FIG. 2 is a block diagram illustrating a search infrastructure, in accordance with an example embodiment.

FIG. 2 is a block diagram illustrating a search infrastructure 200 in accordance with an example embodiment. The search infrastructure 200 includes three layers: an index node layer 202, a name node layer 204, and a load balancer layer 206.

In an example embodiment, the index node layer 202 may comprise a plurality of index nodes 208A-208L, each index node 208A-208L comprising a virtual machine. In addition, each index node 208A-208L can be referred to as a shard. Each shard holds a piece of an index (or sometimes the whole index) for a given tenant. Index nodes 208A-208L are responsible for executing searches on the index. It is possible that the entire tenant index fits in a single shard, but the design may assume that the tenant index may need to be distributed across multiple shards. The index manager 210 is responsible for mapping tenants to shards. The mapping information is stored in an index map 212. A federated query (query based on information from multiple sources) may be used if the tenant data is indexed to multiple shards. An index node 208A-208L may look at the tenant-to-shard mapping data stored in the index map 212 to determine if it needs to execute a local search or a federated search.

Elasticity may be accomplished by adding more index nodes 208A-208L as the index size grows or more tenants are added. Additionally, one failed data node should not cause searches to fail. In order to accomplish this, the index manager 210 can replicate the tenant data into two or more shards. In other words, any given index segment for a given tenant can be served by at least two index nodes 208A-208L.

The name node layer 204 may include a plurality of name nodes 214A-214C. Each name node 214A-214C may be an application responsible for mapping a client search request to an index node 208A-208L. Even though any index node 208A-208L may be capable of serving any search request, the goal of the name node 214A-214C is to select an index node 208A-208L that holds at least part of the tenant index. Thus, in the best-case scenario, the local search is executed by the index node 208A-208L that contains the data in its local index.

In an example embodiment, each name node 214A-214C may look at tenant-to-shard mapping data stored in the index map 212. The name node 214A-214C may perform a lookup on the index map 212 and then redirect the search request to the appropriate index node 208A-208L.

The load balancer layer 206 may include a load balancer 216, whose job it is to receive inbound search requests from client applications 218A-218C and invoke one or more name nodes 214A-214C to satisfy the search requests. The load balancer 216 acts to load balance these search requests among the name nodes 214A-214C.

The index manager 210 may be responsible for assigning tenants to shards. This mapping may be dynamic (e.g., the shards may be assigned to the tenants on demand at run-time). Elasticity may be accomplished by dynamically assigning available capacity to tenants on an as-needed basis.

In an example embodiment, the index manager 210 may include a tool used for capacity planning. The goal is to plan enough capacity to support the data needs for all the tenants.

In an example embodiment, the index manager 210 may be implemented by a set of nodes connected to a coordinator 108 in an active-passive type configuration. One of the index manager 210 nodes can be elected as the primary node by the coordinator 108. The backup index manager 210 nodes can watch the "status" of the primary node and take over if needed. As will be described later, the index manager 210 can be collated with a queue manager 116. The primary API for the index manager 210 may be based on asynchronous queue-based messaging and therefore it makes sense to have the node play a dual role.

In an example embodiment, the index manager 210 node subscribes to one or more tenant queues to receive indexing instructions. This may be the primary interface to the index manager 210. The index manager 210 node may also be connected to the coordinator 108 for watching the current shard configuration information.

Figure 3:
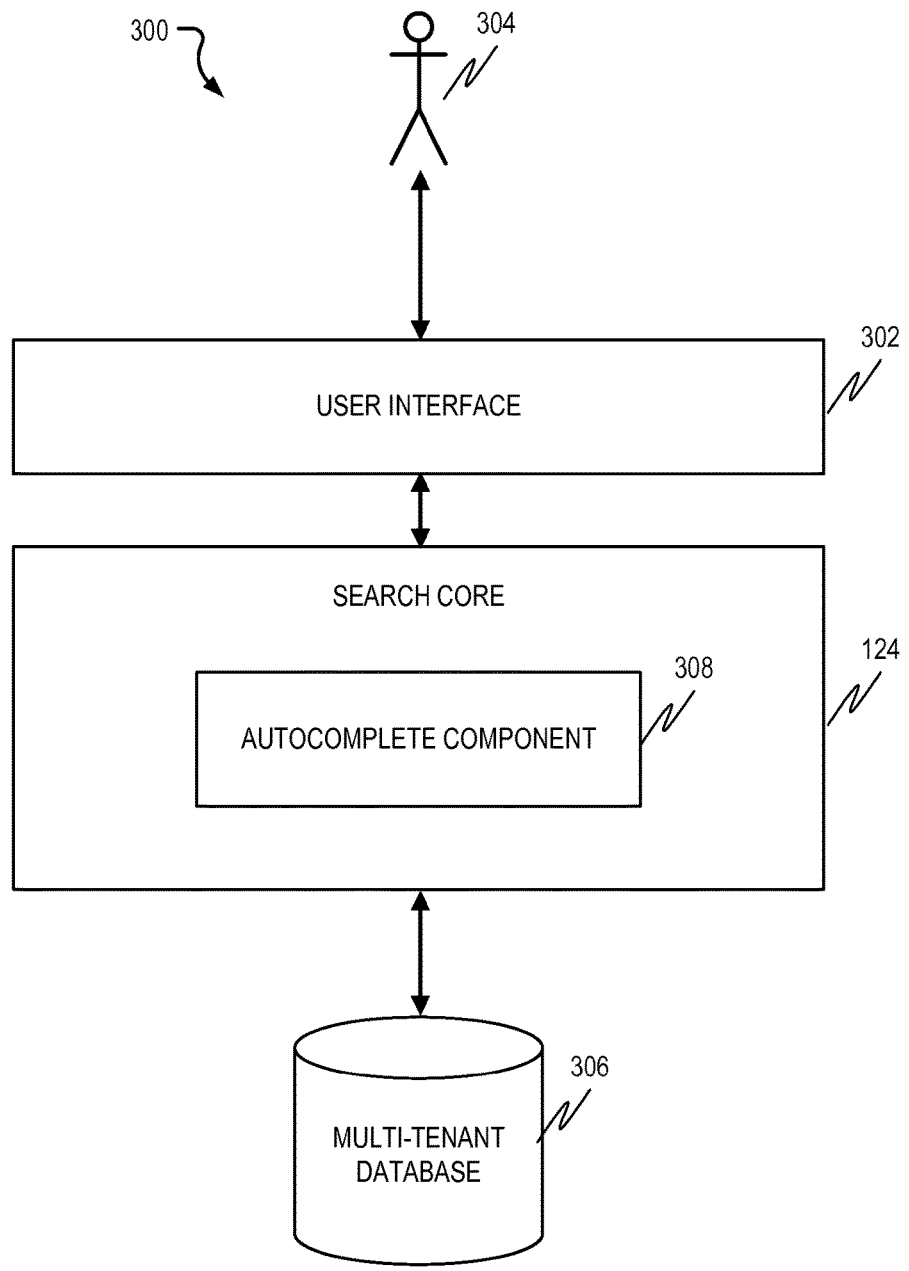
FIG. 3 is a block diagram of a system, including a search core, in accordance with an example embodiment.

In an example embodiment, the search core 124 is modified to include autocomplete capabilities. FIG. 3 is a block diagram of a system 300 including a search core 124 in accordance with an example embodiment. The system 300 includes a user interface 302 which is used by a user 304 to perform various actions involving attempting to retrieve data from a multi-tenant database 306. The operation of the user interface 302 will be described in more detail below, but generally it allows the user 304 to perform actions such as browsing categories of data and data itself, adding filters on the data, selecting data, and entering search terms as a search query to retrieve data. In an example embodiment, the user interface 302 includes an autocomplete component 308, which acts to track the operation of the user interface 302 with respect to the above-described action. These actions, as well as any other information known about the environment in which the user 304 enters search terms, are known collectively as a search context. The search context may be passed to an autocomplete component 308 in the search core 124. When the user 304 begins to enter a search in the user interface 302, the user interface 302 passes the characters and/or terms entered by the user 304 so far. The autocomplete component 308 uses the search context and the characters and/or terms entered by the user 304 so far to generate one or more suggested searches, from fields of data in the multi-tenant database 306.

Figure 4:
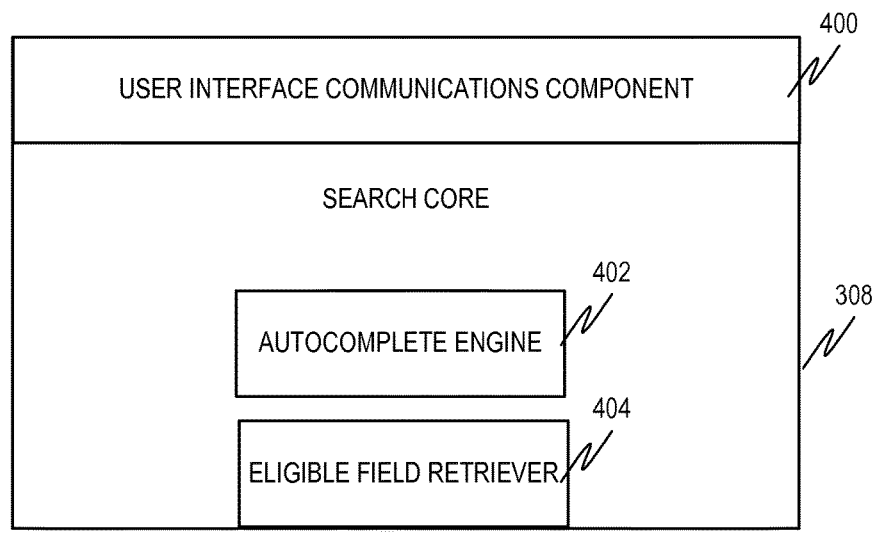
FIG. 4 is a block diagram illustrating an autocomplete component, in accordance with an example embodiment.

FIG. 4 is a block diagram illustrating an autocomplete component 308 in accordance with an example embodiment. The autocomplete component 308 includes a user interface communications component 400, which acts to send data to and receive data from the user interface 302 of FIG. 3. The user interface communications component 400 may be, for example, an application program interface (API). An autocomplete engine 402 may act to take the user context and characters and/or terms entered by the user 304 so far and generate one or more suggested searches, from fields of data in the multi-tenant database 306. This may be performed by utilizing an eligible field retriever 404. The eligible field retriever 404 takes information known about the user 304 such as user identity to retrieve a plurality of fields from the multi-tenant database 306. The information known about the user 304, such as an identification of the user 304, can be used by the eligible field retriever 404 to obtain user permissions. The user permissions may, for example, specify particular catalogs or other groupings of data the user 304 is permitted to view (in contrast to other catalogs or groupings the user 304 is not permitted to view). This information is then used by the eligible field retriever 404 obtain fields from the multi-tenant database 306 that the user 304 is permitted to view. The autocomplete engine 402 then searches the obtained fields for terms that match both the user context and the characters and/or terms the user 304 has entered so far. These matches may be called "autocomplete suggestions." The autocomplete suggestions may then be sent via the user interface communications component 400 to the user interface 302, which then can present one or more of the autocomplete suggestions to the user 304 for selection (although the user 304 can also ignore the presented autocomplete suggestions and continue typing additional characters and/or terms, which can caused further refinement of the autocomplete suggestions by the autocomplete engine 402.

In an example embodiment, particular fields or items in the multi-tenant database 306 may be identified as being "autocompletable." In this way, providers of the underlying data can label certain items or fields within items as not being subject to the autocomplete aspects of the present disclosure. The result is that the eligible field retriever 404 will ignore these items/fields when obtaining fields from the multi-tenant database 306, much like fields from data the user 304 is not permitted to view are ignored. This may be performed, for example, when certain types of data would be confusing to be suggested via autocomplete, such as SKU values.

In another example embodiment, the particular fields or items identified as "autocompletable" may differ based on the user 304 or different user contexts.

In order to speed performance, in an example embodiment, edge ngrams of terms in the multi-tenant database 306 may be created at the time of indexing. Referring back to FIG. 1, the index builder 122 may further include a edge n-gram generator, which generates edge n-grams for terms in data as the data is indexed in the multi-tenant database 306. The edge n-grams may be stored in a separate mapping between edge n-grams and terms in the multi-tenant database 306. This mapping may then be accessed by the eligible field retriever 404 and used to identify entire terms based on an n-gram already typed by the user 304. In an example embodiment, n-gramming up to a fixed number of characters, such as four characters, may be performed. Thus, for every term in the data indexed by the index builder 122, four n-grams for the term may be stored in the mapping (assuming the term is four or more characters long—if it is less then only the n-grams up to the size of the term are stored). Thus, for example, if the term is "flower" then the n-grams "f," "fl," "flo," and "flow" are stored in a mapping to the term "flower". Thus, when a user 304 types the character "f", the term "flower" can quickly be identified by the eligible field retriever 404 as being an eligible term and then, subject to accessibility requirements for the corresponding field, included in the possible fields for autocomplete suggestions. Notably, the limit on the number of characters of n-grams generated may be set by an administrator to effectively balance storage space, indexing speed, and mapping search time. Alternatively, the limit may be set dynamically at runtime based on a number of different performance factors.

Additionally, in an example embodiment, when displaying the autocomplete suggestions to the user 304 and complete terms are part of the suggestions, an upper limit may be established as to the number of term "ahead" that the system will present. For example, a limit of two terms may be set, meaning that if a user 304 is typing a first term in a search query, the autocomplete suggestions presented will only include a second and possibly a third term, but not a fourth or subsequent term, despite the fact that the field itself may contain such additional terms. Likewise, if the user 304 is typing a second term in a search query, the autocomplete suggestions will only include a third and possibly a fourth term, but not a fifth or subsequent term.

In an example embodiment, when the autocomplete suggestions are presented to the user 304 by the user interface 302, they are presented based on a ranking. Due to the fact that there may be hundreds, thousands, or even millions of possible autocomplete suggestions available for a particular character sequence/search term(s), in many instances it will be impossible to present all the possible autocomplete suggestions on the display simultaneously. Therefore, the system may undertake a ranking of the possible autocomplete suggestions and display the highest ranking suggestion(s). This ranking may be based on a number of different factors. In one example embodiment, the ranking is based on frequency that the corresponding autocomplete suggestion appeared in other searches by the user 304. In another example embodiment, the ranking is based on frequency that the corresponding autocomplete suggestion appeared in other searches by other users, including different users at the same tenant, or different users across different tenants.

In another example embodiment, the autocomplete suggestions are not language specific. In other words, no dictionary for a particular language (e.g., English, French) is retrieved and used to perform the analysis of which terms to suggest. Rather, terms from the data, no matter the language, are all stored in the same index of possible autocomplete suggestions.

Figure 5:
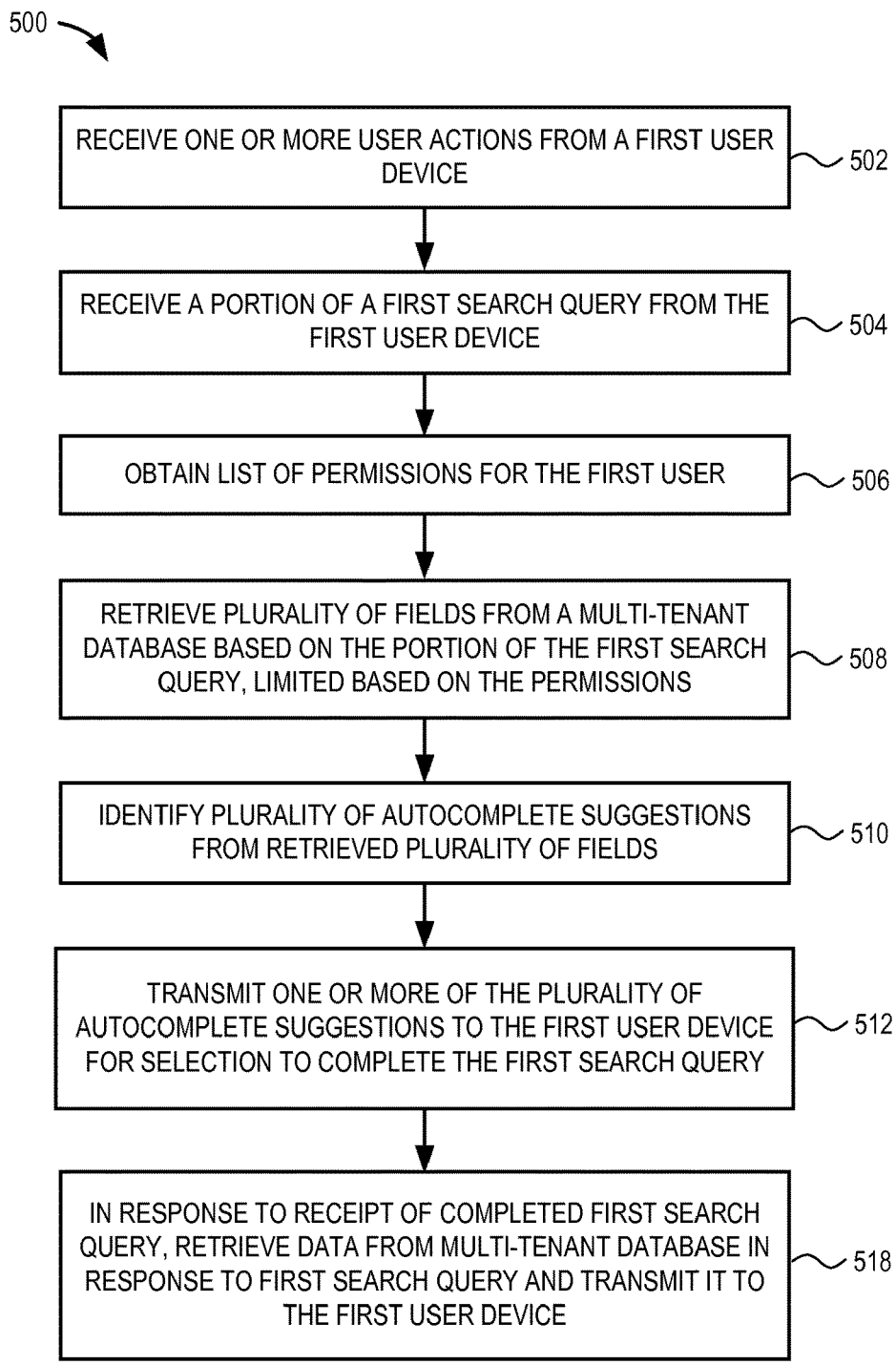
FIG. 5 is a flow diagram illustrating a method, in accordance with an example embodiment, of making autocomplete suggestions.

FIG. 5 is a flow diagram illustrating a method 500, in accordance with an example embodiment, of making autocomplete suggestions. At operation 502, one or more user actions are received from a first user device. As described above, the user actions are actions related to identifying data from a multi-tenant database 306 to view, such as identifying categories or filters, or performing drill down or drill up operations. The first user device may correspond to a first tenant in a multi-tenant architecture. At operation 504, a portion of a first search query is received from the first user device. At operation 506, a list of permissions for the first user device is obtained.

At operation 508, a plurality of fields is retrieved from a multi-tenant database 306 based on the portion of the first search query. The fields are obtained from data stored by multiple different tenants in the multi-tenant database 306, the plurality of fields retrieved being limited to fields for which the first user device has permission to view, as defined by the list of permissions. At operation 510, a plurality of autocomplete suggestions are identified from the plurality of retrieved fields, the identifying based on the user actions. At operation 512, one or more of the plurality of autocomplete suggestions are transmitted to the first user device for selection to complete the first search query. Then at operation 518, upon receipt of the completed first search query, data is retrieved from the multi-tenant database 306 in response to the first search query and transmitted to the first user device.

Figure 6:
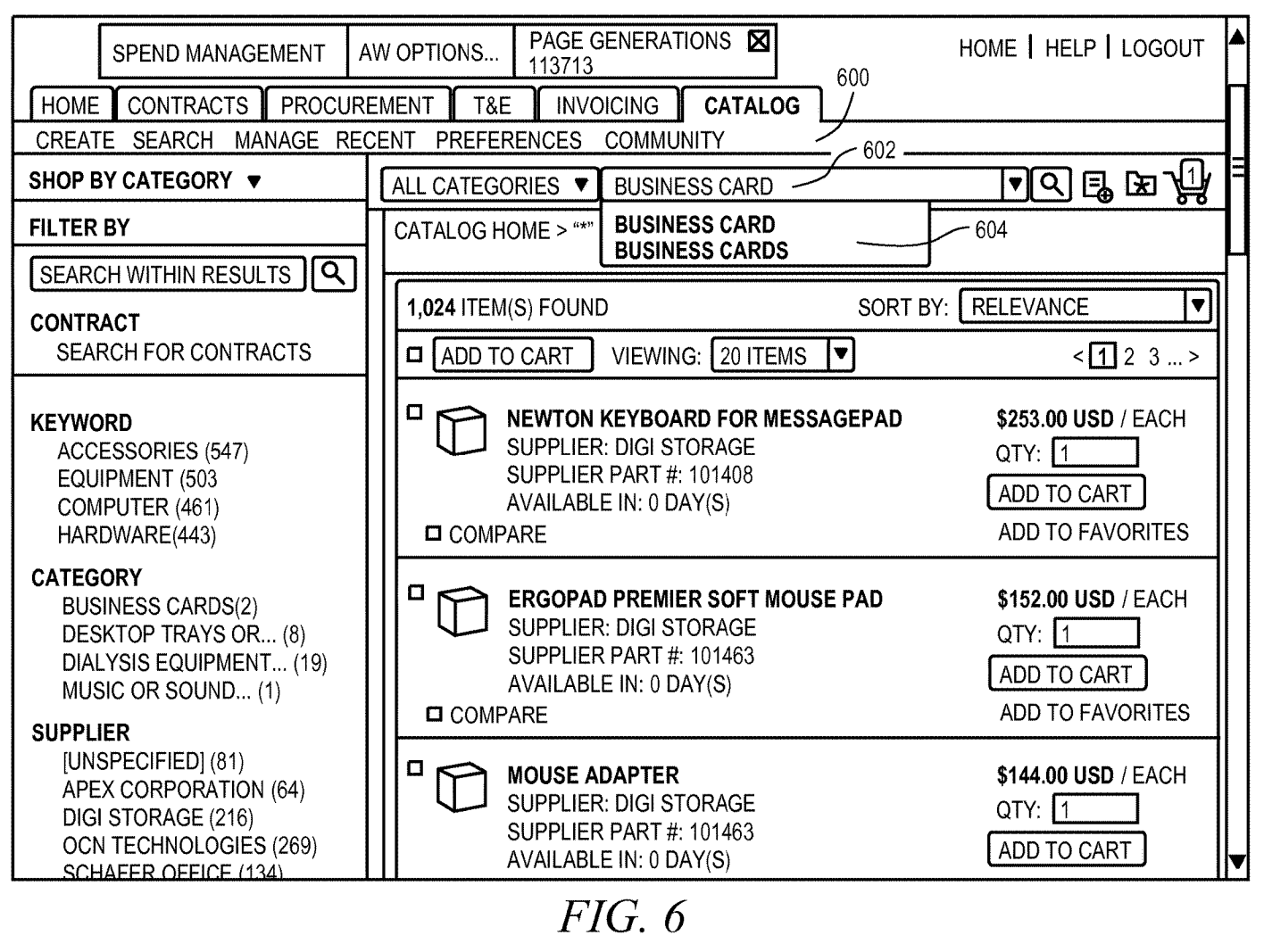

FIG. 6 is a screen capture illustrating a user interface 600 in accordance with an example embodiment. The user interface 600 includes a search box 602 where a user 304 can type in one or more search terms for searching one or more catalogs in a multi-tenant database 306. The user interface 600 also includes an autocomplete suggestions area 604 where one or more autocomplete suggestions are presented to the user 304. In this example embodiment, the user 304 has not really selected a particular context yet and so his or her typing of the term "business card" simply results in autocomplete suggestions of "business card" or "business cards" based on the possible matching terms through the entire multi-tenant database 306, although as described above it is possible that the possible matching terms are selected only from entries in the multi-tenant database 306 that the user 304 has access to.

FIG. 7 is a screen capture illustrating the user interface 600 of FIG. 6, in accordance with an example embodiment, after a selection of a context by a user 304. Here, the user 304 has selected a category "Computers and IT equipment>Printing, Photographic and Audio/Visual Equipment and Supplies." This selection may have occurred via navigation commands and/or through the use of drop-down menu 700. The result is that the current context of the search is "Computers and IT equipment>Printing, Photographic and Audio/Visual Equipment and Supplies."

FIG. 8 is a screen capture illustrating the user interface 600 of FIG. 7, in accordance with an example embodiment, after the user 304 begins typing. Here, the user 304 has typed the word (or partial word) "desk" in the search box 602. Notably, the autocomplete suggestions presented in the autocomplete suggestions area 604 are selected via a search only on the items in the catalogs in the multi-tenant database 306 that are included in the specific category selected as part of the context, namely items in the Computers and IT equipment>Printing, Photographic and Audio/Visual Equipment and Supplies" category. No terms from other categories are presented as the autocomplete suggestions, unless of course they are terms that are also contained in the currently selected context.

Figure 9:
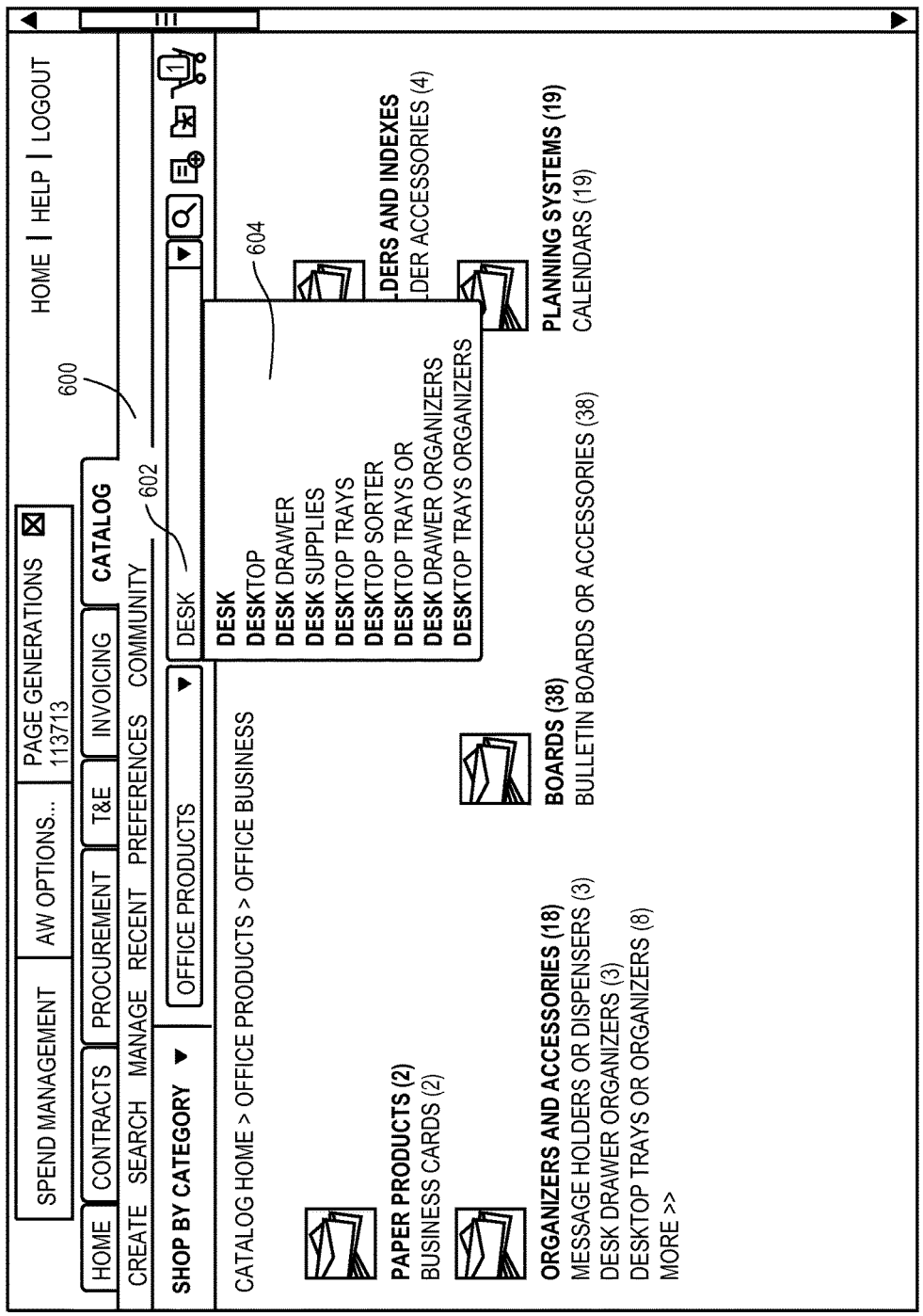
FIG. 9 is a screen capture illustrating the user interface of FIG. 7, in accordance with another example embodiment, after the user begins typing the same term as in FIG. 8.

FIG. 9 is a screen capture illustrating the user interface 600 of FIG. 7, in accordance with another example embodiment, after the user 304 begins typing the same term as in FIG. 8. Specifically, in contrast to FIG. 8, here the category has been selected as "office products". Notably, even though the user 304 still types the word (or partial word) "desk" in the search box 602, there are different autocomplete suggestions presented in the autocomplete suggestions area 604, which are now selected via a search only on the items in the catalogs in the multi-tenant database 306 that are included in the specific category "office products".

Figure 10:
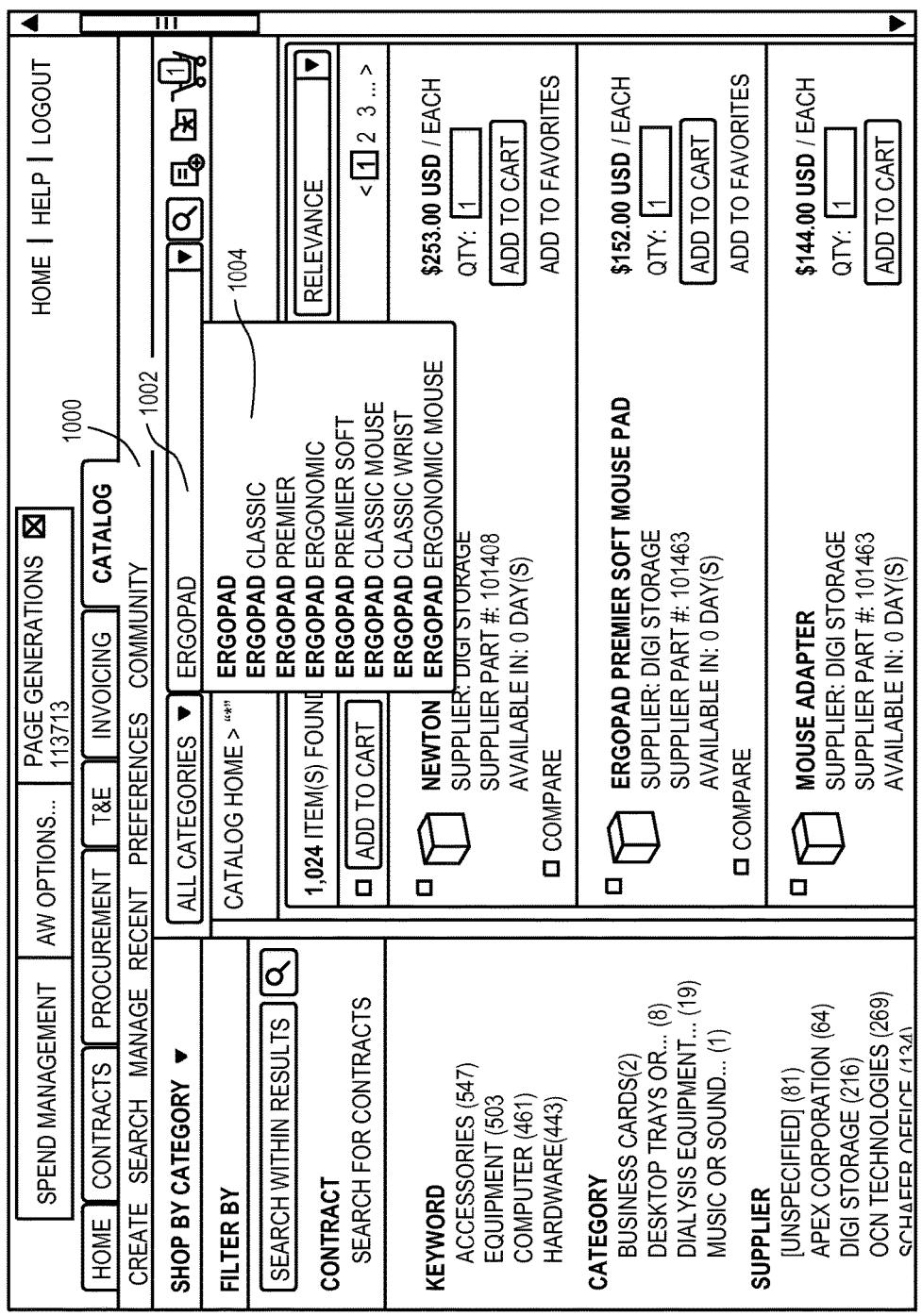
FIG. 10 is a screen capture illustrating a user interface, in accordance with another example embodiment.

FIG. 10 is a screen capture illustrating a user interface 1000 in accordance with another example embodiment. Here, the context of the search is descriptions for each of the items in the catalogs in the multi-dimensional database 306. This context may have either been selected by the user 304 or assigned to the user 304 based on criteria in the system (e.g., detection that the user 304 would like to search on descriptions). As such, when the user 304 types "ergopad" in the search box 1002, the autocomplete suggestions presented in the autocomplete suggestions area 1004 are based on terms in the descriptions of the items in the multi-dimensional database (as opposed to, for example, their titles or part numbers, unless those terms are also contained in the descriptions).

Figure 11:
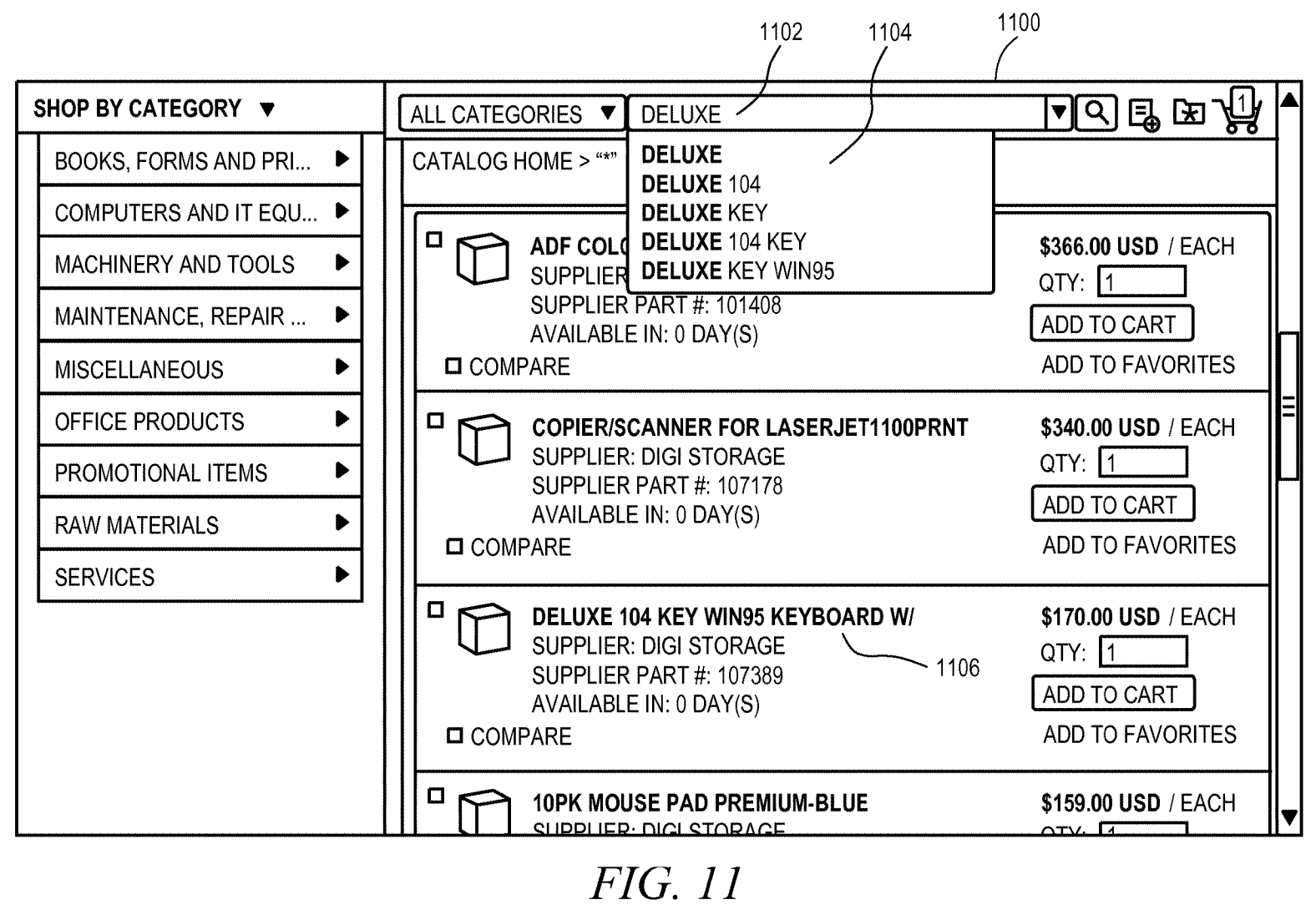

FIG. 11 is a screen capture illustrating a user interface 1100 in accordance with another example embodiment. This figure depicts how autocomplete suggestions may be presented incrementally, with an upper limit on the number of additional terms being suggested on top of what the user 304 is typing in the search box 1102. Here, for example, the upper limit has been set at two terms. As such, when the user 304 types the term "deluxe" in the search box 1102, the autocomplete suggestions in the autocomplete suggestions area 1104 include only up to two additional terms, even though additional matching terms (such as deluxe 104 key win95 keyboard 1106) are found.

Figure 12:
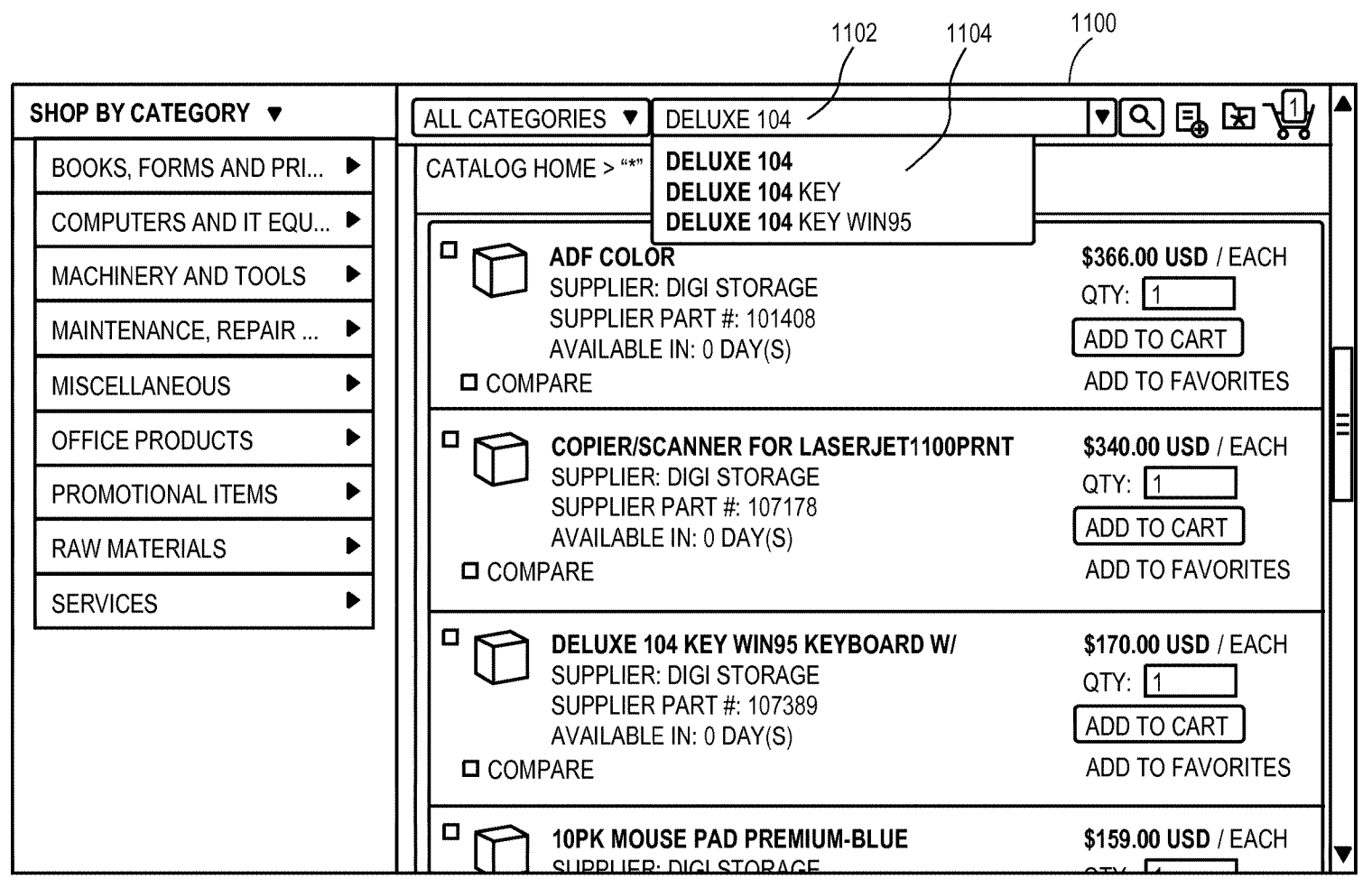

FIG. 12 is a screen capture illustrating the user interface 1100 of FIG. 11, in accordance with an example embodiment, as the user 304 types additional terms. Specifically, the user 304 has additionally added "104" to the search box 1102. This figure depicts how the autocomplete suggestions in the autocomplete suggestions area 1104 now show two additional terms, which means the autocomplete suggestion of "deluxe 104 key win95" is now visible when it was not in FIG. 11.

FIG. 13 is a screen capture illustrating a user interface 1300 in accordance with another example embodiment. Here, when a user 304 types a partial term in the search box 1302, the autocomplete suggestions area 1304 depicts autocomplete suggestions selected solely from the manufacturer name field of the items in the multi-tenant database 306. This may be due to some user action in selecting manufacturer name as the current context or may be assigned to the user 304 based on some other criteria (such as all other fields being marked as "do not autocomplete."

Example Mobile Device

Figure 14:
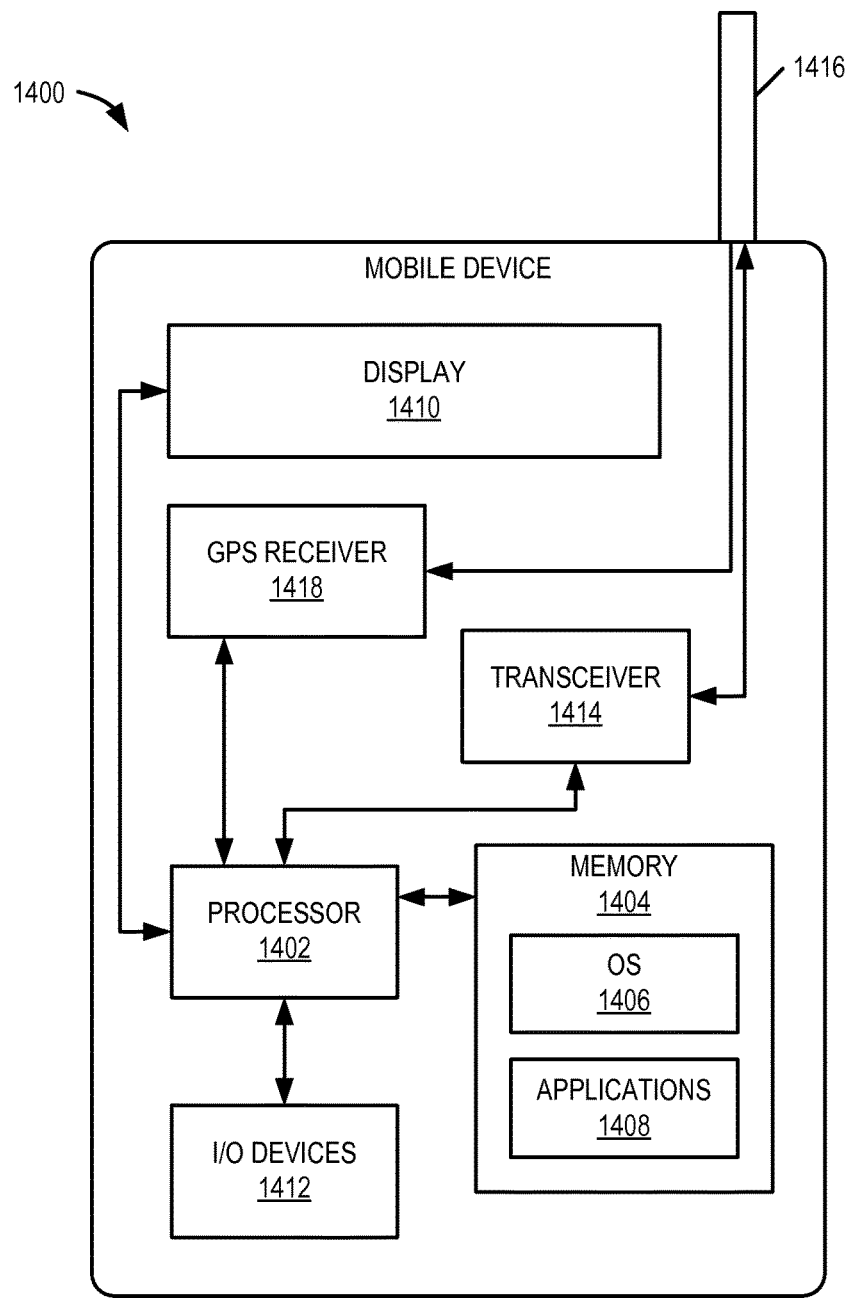
FIG. 14 is a block diagram illustrating a mobile device, according to an example embodiment.

FIG. 14 is a block diagram illustrating a mobile device 1400, according to an example embodiment. The mobile device 1400 may include a processor 1402. The processor 1402 may be any of a variety of different types of commercially available processors 1402 suitable for mobile devices 1400 (for example, an XScale architecture microprocessor, a microprocessor without interlocked pipeline stages (MIPS) architecture processor, or another type of processor 1402). A memory 1404, such as a random access memory (RAM), a flash memory, or another type of memory, is typically accessible to the processor 1402. The memory 1404 may be adapted to store an operating system (OS) 1406, as well as application programs 1408, such as a mobile location enabled application that may provide location-based services to a user 304. The processor 1402 may be coupled, either directly or via appropriate intermediary hardware, to a display 1410 and to one or more input/output (I/O) devices 1412, such as a keypad, a touch panel sensor, a microphone, and the like. Similarly, in some embodiments, the processor 1402 may be coupled to a transceiver 1414 that interfaces with an antenna 1416. The transceiver 1414 may be configured to both transmit and receive cellular network signals, wireless data signals, or other types of signals via the antenna 1416, depending on the nature of the mobile device 1400. Further, in some configurations, a GPS receiver 1418 may also make use of the antenna 1416 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors (e.g., processor 1402) may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor 1402 or another programmable processor 1402) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor 1402 configured using software, the general-purpose processor 1402 may be configured as respective different hardware-implemented modules at different times. Software may accordingly configure a processor 1402, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications among such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors 1402 that are temporarily configured (e.g., by software) or permanently configured to perform the relevant operations. Whether temporarily or permanently configured, such processors 1402 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 1402 or processor-implemented modules. The performance of certain of the operations may be distributed among the one or more processors 1402, not only residing within a single machine, but deployed across a number of machines. In some example embodiments, the processor or processors 1402 may be located in a single location (e.g., within a home environment, an office environment, or a server farm), while in other embodiments, the processors 1402 may be distributed across a number of locations.

The one or more processors 1402 may also operate to support performance of the relevant operations in a "cloud computing" environment or as a "software as a service" (SaaS). For example, at least some of the operations may be performed by a group of computers (as examples of machines including processors 1402), these operations being accessible via a network (e.g., the Internet) and via one or more appropriate interfaces (e.g., application programming interfaces (APIs)).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor 1402, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors 1402 executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor 1402), or in a combination of permanently and temporarily configured hardware may be a design choice. Below are set out hardware (e.g., machine) and software architectures that may be deployed, in various example embodiments.

Example Machine Architecture and Machine-Readable Medium

Figure 15:
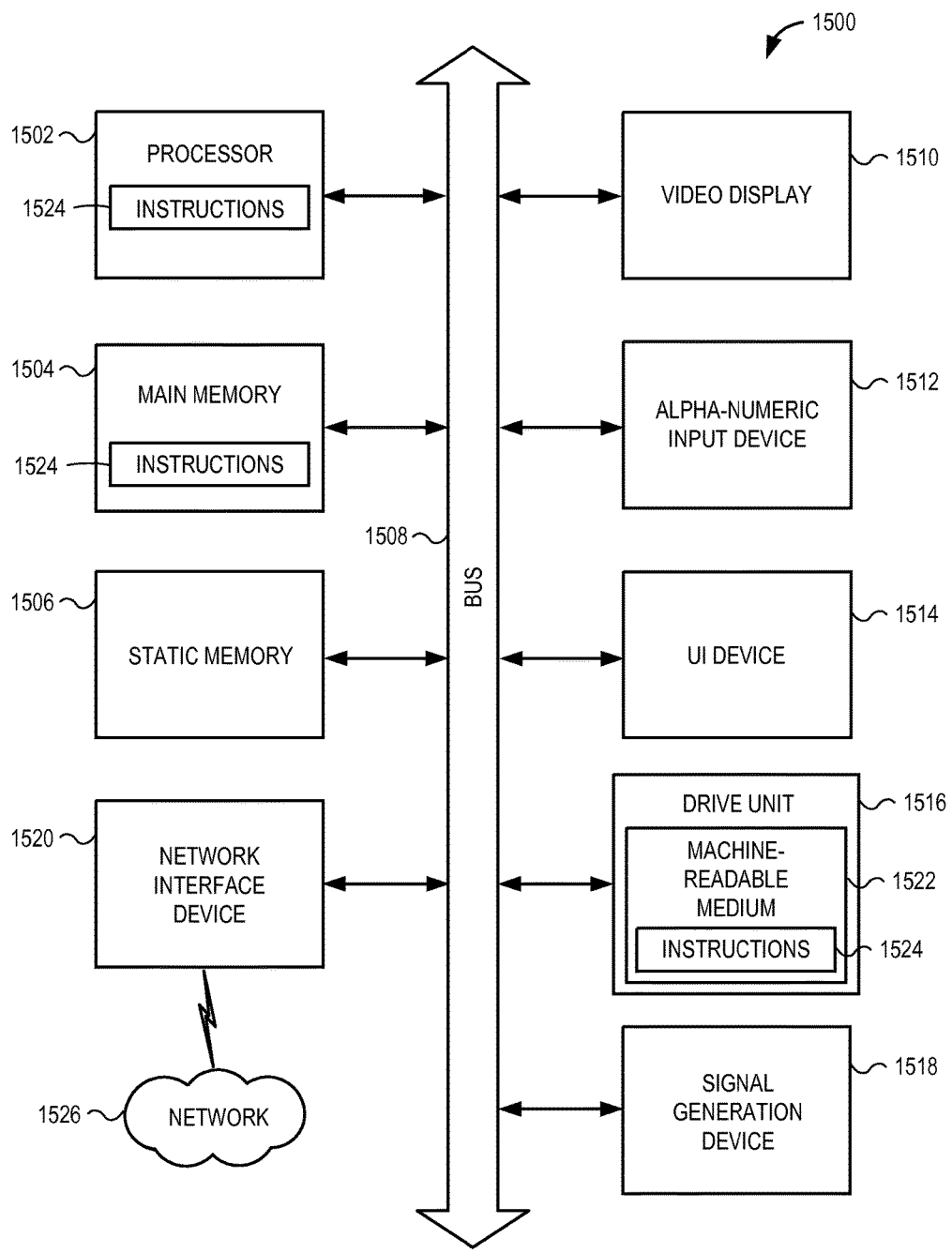
FIG. 15 is a block diagram of a machine in the example form of a computer system within which instructions may be executed for causing the machine to perform any one or more of the methodologies discussed herein.

FIG. 15 is a block diagram of a machine in the example form of a computer system 1500 within which instructions 1524 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions 1524 (sequential or otherwise) that specify actions to be taken by that machine. Further, while only a single machine is illustrated, the term "machine" shall also be taken to include any collection of machines that individually or jointly execute a set (or multiple sets) of instructions 1524 to perform any one or more of the methodologies discussed herein.

The example computer system 1500 includes a processor 1502 (e.g., a central processing unit (CPU), a graphics processing unit (GPU), or both), a main memory 1504, and a static memory 1506, which communicate with each other via a bus 1508. The computer system 1500 may further include a video display unit 1510 (e.g., a liquid crystal display (LCD) or a cathode ray tube (CRT)). The computer system 1500 also includes an alphanumeric input device 1512 (e.g., a keyboard or a touch-sensitive display screen), a user interface (UI) navigation (or cursor control) device 1514 (e.g., a mouse), a disk drive unit 1516, a signal generation device 1518 (e.g., a speaker), and a network interface device 1520.

Machine-Readable Medium

The disk drive unit 1516 includes a machine-readable medium 1522 on which is stored one or more sets of data structures and instructions 1524 (e.g., software) embodying or utilized by any one or more of the methodologies or functions described herein. The instructions 1524 may also reside, completely or at least partially, within the main memory 1504 and/or within the processor 1502 during execution thereof by the computer system 1500, with the main memory 1504 and the processor 1502 also constituting machine-readable media 1522.

While the machine-readable medium 1522 is shown, in an example embodiment, to be a single medium, the term "machine-readable medium" may include a single medium or multiple media (e.g., a centralized or distributed database 106, and/or associated caches and servers) that store the one or more instructions 1524 or data structures. The term "machine-readable medium" shall also be taken to include any tangible medium that is capable of storing, encoding, or carrying the instructions 1524 for execution by the machine and that cause the machine to perform any one or more of the methodologies of the present disclosure, or that is capable of storing, encoding, or carrying data structures utilized by or associated with such instructions 1524. The term "machine-readable medium" shall accordingly be taken to include, but not be limited to, solid-state memories, and optical and magnetic media. Specific examples of machine-readable media 1522 include non-volatile memory, including, by way of example, semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 1524 may further be transmitted or received over a communication network 1526 using a transmission medium. The instructions 1524 may be transmitted using the network interface device 1520 and any one of a number of well-known transfer protocols (e.g., HTTP). Examples of communication networks 1526 include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying the instructions 1524 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
    receiving identifications of user actions from a first user device, the user actions being actions performed via a graphical user interface to identify data from a multi-tenant database to view;
    receiving a portion of a first search query from a first user device corresponding to a first tenant in a multi-tenant architecture;
    obtaining a list of permissions for the first user device;
    extracting a plurality of autocomplete suggestions from a plurality of fields from a multi-tenant database based on the portion of the first search query, the fields obtained from data stored by multiple different tenants in the multi-tenant database, the plurality of fields from which the autocomplete suggestions are extracted being limited to fields for which the first user device has permission to view;
    transmitting one or more of the plurality of autocomplete suggestions to the first user device for display in the graphical user interface and allowing for user selection of one or more of the autocomplete suggestions via the graphical user interface to complete the first search query; and
    upon receipt of the completed first search query, retrieving data from the multi-tenant database in response to the first search query and transmitting the retrieved data to the first user device.

2. The method of claim 1, wherein the user actions include identifying a category of items in a catalog to view.

3. The method of claim 1, wherein the user actions include identifying a filter to be applied to items in a catalog.

4. The method of claim 1, wherein the data in the multi-tenant database includes catalogs supplied by at least two different tenants.

5. The method of claim 1, wherein the data in the multi-tenant database includes fields written in a plurality of different languages.

6. The method of claim 1, further comprising indexing data from a plurality of tenants, the indexing including creating a mapping of n-grams from a plurality of fields of the data.

7. The method of claim 1, wherein the extracting includes excluding fields from consideration that are not identified as being autocompletable.

8. A system comprising:
    an indexing core executable on one or more processors, the indexing core configured to index data received from multiple tenants in a multi-tenant database; and
    a search core configured to:
    receive identifications of user actions from a first user device, the user actions being actions performed in a graphical user interface to identify data from a multi-tenant database to view;
    receive a portion of a first search query from a first user device corresponding to a first tenant in a multi-tenant architecture;
    obtain a list of permissions for the first user device;
    extract a plurality of autocomplete suggestions from a plurality of fields from a multi-tenant database based on the portion of the first search query, the fields obtained from data stored by multiple different tenants in the multi-tenant database, the plurality of fields from which the autocomplete suggestions are extracted being limited to fields for which the first user device has permission to view;
    transmit one or more of the plurality autocomplete suggestions to the first user device for display in the graphical user interface and allowing for user selection of one or more of the autocomplete suggestions in the graphical user interface to complete the first search query; and
    upon receipt of the completed first search query, retrieve data from the multi-tenant database in response to the first search query and transmit the retrieved data to the first user device.

9. The system of claim 8, wherein the user actions and the portion of the first query are retrieved from a user interface running on the first user device.

10. The system of claim 8, wherein the extracting is performed by an eligible field retriever in the search core.

11. The system of claim 10, wherein the identification of the plurality of autocomplete suggestions is performed by an autocomplete engine in the search core.

12. The system of claim 11, wherein the indexing core is further configured to create a mapping of n-grams from a plurality of fields of the data.

13. The system of claim 12, wherein the autocomplete engine is configured to use the mapping of n-grams in the identifying of the plurality of autocomplete suggestions.

14. A non-transitory machine-readable storage medium comprising instructions which, when implemented by one or more machines, cause the one or more machines to perform operations comprising:
    receiving identifications of user actions from a first user device, the user actions being actions performed via a graphical user interface to identify data from a multi-tenant database to view;
    receiving a portion of a first search query from a first user device corresponding to a first tenant in a multi-tenant architecture;
    obtaining a list of permissions for the first user device;

extracting a plurality of autocomplete suggestions from a plurality of fields from a multi-tenant database based on the portion of the first search query, the fields obtained from data stored by multiple different tenants in the multi-tenant database, the plurality of fields from which the autocomplete suggestions are extracted being limited to fields for which the first user device has permission to view;

transmitting one or more of the plurality of autocomplete suggestions to the first user device for display in the graphical user interface and allowing for user selection of one or more of the autocomplete suggestions via the graphical user interface to complete the first search query; and upon receipt of the completed first search query, retrieving data from the multi-tenant database in response to the first search query and transmitting the retrieved data to the first user device.

15. The non-transitory machine-readable storage medium of claim 14, wherein the user actions include identifying a category of items in a catalog to view.

16. The non-transitory machine-readable storage medium of claim 14, wherein the user actions include identifying a filter to be applied to items in a catalog.

17. The non-transitory machine-readable storage medium of claim 14, wherein the data in the multi-tenant database includes catalogs supplied by at least two different tenants.

18. The non-transitory machine-readable storage medium of claim 14, wherein the data in the multi-tenant database includes fields written in a plurality of different languages.

19. The non-transitory machine-readable storage medium of claim 14, further comprising indexing data from a plurality of tenants, the indexing including creating a mapping of n-grams from a plurality of fields of the data.

20. The non-transitory machine-readable storage medium of claim 14, wherein the extracting includes excluding fields from consideration that are not identified as being autocompletable.

* * * * *